(12) United States Patent
Lottes

(10) Patent No.: US 9,710,894 B2
(45) Date of Patent: Jul. 18, 2017

(54) SYSTEM AND METHOD FOR ENHANCED MULTI-SAMPLE ANTI-ALIASING

(71) Applicant: NVIDIA Corporation, Santa Clara, CA (US)

(72) Inventor: Timothy Paul Lottes, Milpitas, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/910,007

(22) Filed: Jun. 4, 2013

(65) Prior Publication Data

US 2014/0354675 A1  Dec. 4, 2014

(51) Int. Cl.
| | | |
|---|---|---|
| G09G 5/00 | (2006.01) | |
| G06T 5/00 | (2006.01) | |
| G06K 9/40 | (2006.01) | |
| G06T 11/00 | (2006.01) | |
| G06T 5/20 | (2006.01) | |

(52) U.S. Cl.
CPC .......... *G06T 5/002* (2013.01); *G06T 5/20* (2013.01); *G06T 11/001* (2013.01); *G06T 2207/10024* (2013.01)

(58) Field of Classification Search
CPC combination set(s) only.
See application file for complete search history.

(56) References Cited

U.S. PATENT DOCUMENTS

| | | |
|---|---|---|
| 4,208,810 A | 6/1980 | Rohner et al. |
| 4,918,626 A | 4/1990 | Watkins et al. |
| 5,043,810 A * | 8/1991 | Vreeswijk et al. ...... 375/240.14 |
| 5,081,594 A | 1/1992 | Horsley |
| 5,287,438 A | 2/1994 | Kelleher |
| 5,313,287 A | 5/1994 | Barton |
| 5,432,898 A | 7/1995 | Curb et al. |
| 5,446,836 A | 8/1995 | Lentz et al. |
| 5,452,104 A | 9/1995 | Lee |
| 5,452,412 A | 9/1995 | Johnson, Jr. et al. |

(Continued)

FOREIGN PATENT DOCUMENTS

| | | |
|---|---|---|
| CN | 101093578 | 12/2007 |
| JP | 06180758 | 6/1994 |

(Continued)

OTHER PUBLICATIONS

A Hardware Assisted Design Rule Check Architecture Larry Seller Jan. 1982 Proceedings of the 19th Conference on Design Automation DAC '82 Publisher: IEEE Press.

(Continued)

*Primary Examiner* — Wesner Sajous (57) ABSTRACT

A system and method for enhanced multi-sample anti-aliasing. The method includes determining a sampling pattern corresponding to a pixel and adjusting the sampling pattern based on a visual effect (e.g., post-processing visual effect). The method further includes accessing a first plurality of samples based on the sampling pattern. The first plurality of samples may comprise a second plurality of samples within the pixel and a third plurality of pixels outside of the pixel. The method further includes performing anti-aliasing filtering of the pixel based on the first plurality of samples and the sampling pattern.

20 Claims, 6 Drawing Sheets

(56) References Cited

U.S. PATENT DOCUMENTS

| | | |
|---|---|---|
| 5,483,258 A | 1/1996 | Cornett et al. |
| 5,543,935 A | 8/1996 | Harrington |
| 5,570,463 A | 10/1996 | Dao |
| 5,594,854 A | 1/1997 | Baldwin et al. |
| 5,623,692 A | 4/1997 | Priem et al. |
| 5,633,297 A | 5/1997 | Valko et al. |
| 5,664,162 A | 9/1997 | Dye |
| 5,815,162 A | 9/1998 | Levine |
| 5,854,631 A | 12/1998 | Akeley et al. |
| 5,854,637 A | 12/1998 | Sturges |
| 5,872,902 A | 2/1999 | Kuchkuda et al. |
| 5,977,987 A | 11/1999 | Duluk, Jr. |
| 6,028,608 A * | 2/2000 | Jenkins .................. 345/619 |
| 6,034,699 A | 3/2000 | Wong et al. |
| 6,072,500 A | 6/2000 | Foran et al. |
| 6,104,407 A | 8/2000 | Aleksic et al. |
| 6,104,417 A | 8/2000 | Nielsen et al. |
| 6,115,049 A | 9/2000 | Winner et al. |
| 6,118,394 A | 9/2000 | Onaya |
| 6,128,000 A | 10/2000 | Jouppi et al. |
| 6,137,918 A | 10/2000 | Harrington et al. |
| 6,160,557 A | 12/2000 | Narayanaswami |
| 6,160,559 A | 12/2000 | Omtzigt |
| 6,188,394 B1 | 2/2001 | Morein et al. |
| 6,201,545 B1 | 3/2001 | Wong et al. |
| 6,204,859 B1 | 3/2001 | Jouppi et al. |
| 6,219,070 B1 | 4/2001 | Baker et al. |
| 6,249,853 B1 | 6/2001 | Porterfield |
| 6,259,460 B1 | 7/2001 | Gossett et al. |
| 6,323,874 B1 | 11/2001 | Gossett |
| 6,359,623 B1 | 3/2002 | Larson |
| 6,362,819 B1 | 3/2002 | Dalal et al. |
| 6,366,289 B1 | 4/2002 | Johns |
| 6,370,270 B1 * | 4/2002 | Nair et al. ................ 382/209 |
| 6,429,877 B1 | 8/2002 | Stroyan |
| 6,437,780 B1 | 8/2002 | Baltaretu et al. |
| 6,452,595 B1 | 9/2002 | Montrym et al. |
| 6,469,707 B1 | 10/2002 | Voorhies |
| 6,480,205 B1 | 11/2002 | Greene et al. |
| 6,501,564 B1 | 12/2002 | Schramm et al. |
| 6,504,542 B1 | 1/2003 | Voorhies et al. |
| 6,522,329 B1 | 2/2003 | Ihara et al. |
| 6,525,737 B1 | 2/2003 | Duluk, Jr. et al. |
| 6,529,207 B1 | 3/2003 | Landau et al. |
| 6,606,093 B1 | 8/2003 | Gossett et al. |
| 6,611,272 B1 | 8/2003 | Hussain et al. |
| 6,614,444 B1 | 9/2003 | Duluk, Jr. et al. |
| 6,614,448 B1 | 9/2003 | Garlick et al. |
| 6,624,823 B2 | 9/2003 | Deering |
| 6,633,197 B1 | 10/2003 | Sutardja |
| 6,633,297 B2 | 10/2003 | McCormack et al. |
| 6,671,000 B1 | 12/2003 | Cloutier |
| 6,693,637 B2 | 2/2004 | Koneru et al. |
| 6,693,639 B2 | 2/2004 | Duluk, Jr. et al. |
| 6,697,063 B1 | 2/2004 | Zhu |
| 6,717,576 B1 | 4/2004 | Duluk, Jr. et al. |
| 6,717,578 B1 | 4/2004 | Deering |
| 6,734,861 B1 | 5/2004 | Van Dyke et al. |
| 6,741,247 B1 | 5/2004 | Fenney |
| 6,747,057 B2 | 6/2004 | Ruzafa et al. |
| 6,765,575 B1 | 7/2004 | Voorhies et al. |
| 6,778,177 B1 | 8/2004 | Furtner |
| 6,788,301 B2 | 9/2004 | Thrasher |
| 6,798,410 B1 | 9/2004 | Redshaw et al. |
| 6,803,916 B2 | 10/2004 | Ramani et al. |
| 6,819,332 B2 | 11/2004 | Baldwin |
| 6,833,835 B1 | 12/2004 | van Vugt |
| 6,906,716 B2 | 6/2005 | Moreton et al. |
| 6,938,176 B2 | 8/2005 | Alben et al. |
| 6,940,514 B1 | 9/2005 | Wasserman et al. |
| 6,947,057 B2 | 9/2005 | Nelson et al. |
| 6,956,579 B1 | 10/2005 | Diard et al. |
| 6,961,057 B1 | 11/2005 | Van Dyke et al. |
| 6,978,317 B2 | 12/2005 | Anantha et al. |
| 7,002,591 B1 | 2/2006 | Leather et al. |
| 7,009,607 B2 | 3/2006 | Lindholm et al. |
| 7,009,615 B1 | 3/2006 | Kilgard et al. |
| 7,061,495 B1 | 6/2006 | Leather |
| 7,064,771 B1 | 6/2006 | Jouppi et al. |
| 7,075,542 B1 | 7/2006 | Leather |
| 7,081,902 B1 | 7/2006 | Crow et al. |
| 7,119,809 B1 | 10/2006 | McCabe |
| 7,126,600 B1 | 10/2006 | Fowler et al. |
| 7,154,066 B2 | 12/2006 | Talwar et al. |
| 7,158,148 B2 | 1/2007 | Toji et al. |
| 7,170,515 B1 | 1/2007 | Zhu |
| 7,184,040 B1 | 2/2007 | Tzvetkov |
| 7,224,364 B1 | 5/2007 | Yue et al. |
| 7,307,628 B1 | 12/2007 | Goodman et al. |
| 7,307,638 B2 | 12/2007 | Leather et al. |
| 7,382,368 B1 | 6/2008 | Molnar et al. |
| 7,453,466 B2 | 11/2008 | Hux et al. |
| 7,483,029 B2 | 1/2009 | Crow et al. |
| 7,548,996 B2 | 6/2009 | Baker et al. |
| 7,551,174 B2 | 6/2009 | Iourcha et al. |
| 7,633,506 B1 | 12/2009 | Leather et al. |
| 7,634,637 B1 | 12/2009 | Lindholm et al. |
| 7,791,617 B2 | 9/2010 | Crow et al. |
| 7,965,902 B1 | 6/2011 | Zelinka et al. |
| 8,063,903 B2 | 11/2011 | Vignon et al. |
| 8,390,645 B1 | 3/2013 | Crow et al. |
| 9,117,309 B1 | 8/2015 | Crow |
| 2001/0005209 A1 | 6/2001 | Lindholm et al. |
| 2002/0050979 A1 | 5/2002 | Oberoi et al. |
| 2002/0097241 A1 | 7/2002 | McCormack et al. |
| 2002/0130863 A1 | 9/2002 | Baldwin |
| 2002/0140655 A1 | 10/2002 | Liang et al. |
| 2002/0158885 A1 | 10/2002 | Brokenshire et al. |
| 2002/0196251 A1 | 12/2002 | Duluk, Jr. et al. |
| 2003/0038818 A1 * | 2/2003 | Tidwell .................. 345/611 |
| 2003/0067468 A1 | 4/2003 | Duluk, Jr. et al. |
| 2003/0076325 A1 | 4/2003 | Thrasher |
| 2003/0122815 A1 | 7/2003 | Deering |
| 2003/0163589 A1 | 8/2003 | Bunce et al. |
| 2003/0194116 A1 | 10/2003 | Wong et al. |
| 2003/0201994 A1 | 10/2003 | Taylor et al. |
| 2004/0085313 A1 | 5/2004 | Moreton et al. |
| 2004/0130552 A1 | 7/2004 | Duluk, Jr. et al. |
| 2004/0183801 A1 | 9/2004 | Deering |
| 2004/0196285 A1 | 10/2004 | Rice et al. |
| 2004/0207642 A1 | 10/2004 | Crisu et al. |
| 2004/0246251 A1 | 12/2004 | Fenney et al. |
| 2005/0030314 A1 | 2/2005 | Dawson |
| 2005/0041037 A1 | 2/2005 | Dawson |
| 2005/0066148 A1 | 3/2005 | Luick |
| 2005/0122338 A1 | 6/2005 | Hong et al. |
| 2005/0134588 A1 | 6/2005 | Aila et al. |
| 2005/0134603 A1 | 6/2005 | Iourcha et al. |
| 2005/0179698 A1 | 8/2005 | Vijayakumar et al. |
| 2005/0259100 A1 | 11/2005 | Teruyama |
| 2006/0044317 A1 | 3/2006 | Bourd et al. |
| 2006/0170690 A1 | 8/2006 | Leather |
| 2006/0203005 A1 | 9/2006 | Hunter |
| 2006/0245001 A1 | 11/2006 | Lee et al. |
| 2006/0267981 A1 | 11/2006 | Naoi |
| 2006/0269155 A1 * | 11/2006 | Tener .................. G06T 3/4038 382/243 |
| 2007/0035706 A1 * | 2/2007 | Margulis .................. 353/122 |
| 2007/0035707 A1 * | 2/2007 | Margulis .................. 353/122 |
| 2007/0074266 A1 * | 3/2007 | Raveendran ........... H04N 5/144 725/135 |
| 2007/0087145 A1 * | 4/2007 | Hanita .................. C08L 67/02 428/35.7 |
| 2007/0139440 A1 | 6/2007 | Crow et al. |
| 2007/0268298 A1 | 11/2007 | Alben et al. |
| 2007/0273689 A1 | 11/2007 | Tsao |
| 2007/0296725 A1 | 12/2007 | Steiner et al. |
| 2008/0024497 A1 | 1/2008 | Crow et al. |
| 2008/0024522 A1 | 1/2008 | Crow et al. |
| 2008/0100618 A1 | 5/2008 | Woo et al. |
| 2008/0151101 A1 * | 6/2008 | Tian .................. H04N 5/145 348/448 |
| 2008/0273218 A1 | 11/2008 | Kitora et al. |
| 2009/0083692 A1 * | 3/2009 | Rieger et al. .................. 716/21 |

(56) References Cited

U.S. PATENT DOCUMENTS

| | | | |
|---|---|---|---|
| 2009/0083693 A1* | 3/2009 | Rieger et al. | 716/21 |
| 2011/0188744 A1* | 8/2011 | Sun | G06T 5/50 382/162 |
| 2011/0221762 A1* | 9/2011 | Cheng | G09G 3/3648 345/611 |
| 2014/0098883 A1* | 4/2014 | Hannuksela | H04N 19/597 375/240.16 |
| 2014/0301463 A1* | 10/2014 | Rusanovskyy et al. | 375/240.14 |

FOREIGN PATENT DOCUMENTS

| | | |
|---|---|---|
| JP | 10134198 | 5/1998 |
| JP | 11195132 | 7/1999 |
| JP | 2005182547 | 7/2005 |
| WO | 0013145 | 3/2000 |

OTHER PUBLICATIONS

A Parallel Alogorithm for Polygon Rasterization Juan Pineda Jun. 1988 ACM.

A VLSI Architecture for Updating Raster-Scan Displays Satish Gupta, Robert F. Sproull, Ivan E. Sutherland Aug. 1981 ACM SIGGRAPH Computer Graphics, Proceedings of the 8th Annual Conference on Computer Graphics and Interactive Techniques SIGGRAPH '81, vol. 15 Issue Publisher ACM Press.

Blythe, OpenGL section 3.4.1, Basic Line Segment Rasterization, Mar. 29, 1997, pp. 1-3.

Boyer, et al.; "Discrete Analysis for Antialiased Lines;" Eurographics 2000; 3 Pages.

Crow; "The Use of Grayscale for Improves Raster Display of Vectors and Characters;" University of Texas, Austin, Texas; Work supported by the National Science Foundation unser Grants MCS 76-83889; pp. 1-5: ACM Press.

Foley, J. "Computer Graphics: Principles and Practice", 1987, Addison-Wesley Publishing, 2nd Edition, pp. 545-546.

Fuchs; "Fast Spheres Shadow, Textures, Transparencies, and Image Enhancements in Pixel-Planes"; ACM; 1985; Department of Computer Science, University of North Carolina at Chapel Hill, Chapel Hill, NC 27514.

* cited by examiner

SYSTEM AND METHOD FOR ENHANCED MULTI-SAMPLE ANTI-ALIASING

FIELD OF THE INVENTION

Embodiments of the present invention are generally related to graphics processing units (GPUs), anti-aliasing, and post-processing.

BACKGROUND OF THE INVENTION

As computer systems have advanced, graphics processing units (GPUs) have become increasingly advanced both in complexity and computing power. GPUs handle processing of increasingly large and complex graphics. GPUs are increasingly used to perform post-processing to add visual effects to create more realistic and accurate images.

Conventional GPUs first perform multi-sample anti-aliasing (MSAA) resolve and then post-processing on a rendered image before outputting the image. Post-processing is one or more processes applied after rendering which attempts to simulate various visual effects. Unfortunately, information is lost when MSAA resolve is performed. For example, on edges of an object, the MSAA resolve process blends together samples from near and far surfaces into one pixel thereby removing near and far surface information. Conventional solutions apply post-processing after MSAA resolve and post-processing can therefore not be applied to the samples of each pixel thereby resulting in post-processing not being applied to correctly simulate the intended visual effects. For example, background samples may need an out-of-focus blur while foreground samples might need to be sharp and in focus. In such a case, the post-processing results in removing anti-aliasing on edges in which the post-processing is different for background and foreground samples.

MSAA resolve is usually performed with a box filter that takes the average of all of the samples in a pixel. This box filter works as intended when using color that is in a low-dynamic-range perceptual color-space. However, correct post-processing requires an HDR linear color-space. Often graphics engines need to compromise on performance and resolve two surfaces, once in LDR perceptual color-space for anti-aliasing, and again in an HDR linear color-space for post-processing. Further, in cases where a box filter is used to perform MSAA resolve, the box filter provides relatively poor filtering quality.

SUMMARY OF THE INVENTION

Accordingly, what is needed are solutions to allow post-processing processes to be applied without prior loss of information and improved visual quality. Embodiments of the present invention are operable to perform post-processing processes before or during multi-sample anti-aliasing resolve thereby providing enhanced and more accurate visual results. Embodiments of the present invention further utilize results or samples from prior frames to perform temporal anti-aliasing thereby increasing visual quality (e.g., reduced flicker and ghosting).

In one embodiment, the present invention is directed to a method for performing anti-aliasing. The method includes determining a sampling pattern corresponding to a pixel and adjusting the sampling pattern based on a visual effect (e.g., post-processing visual effect such as motion blur or depth of field). The method further includes accessing a first plurality of samples based on the sampling pattern. The first plurality of samples may comprise a second plurality of samples within the pixel and a third plurality of samples outside of the pixel. The further includes performing anti-aliasing filtering of the pixel based on the first plurality of samples (e.g., samples within the pixel and sample outside of the pixel) and the sampling pattern. The anti-aliasing filtering may resolve the pixels in a linear high dynamic range (HDR) color-space. In one exemplary embodiment, the anti-aliasing filtering comprises cubic filtering. The method may further include converting the pixel to a low dynamic range (LDR) display color-space after each of the samples is resolved to a single sample per pixel.

In another embodiment, the present invention is directed toward a method for increasing visual quality (e.g., reduced flicker and increased clarity). The method includes accessing a current frame, a prior frame, and a motion vector operable for mapping a previous frame to a current frame. The method includes determining a portion of the prior frame corresponding to a portion of the current frame based on the motion vector. In one embodiment, the portion of the prior frame comprises a pixel. In another embodiment, the portion of the prior frame comprises a plurality of samples. The method may further include reducing the portion of the prior frame in proportion to an amount that the portion of the prior frame is out of the color range of the portion of the current frame. The method may further include performing multi-sample anti-aliasing of the portion of the current frame based on the portion of the prior frame and the portion of the current frame. In one exemplary embodiment, the method may further include blending a prior filtered color sample with one of the first plurality of samples prior to the anti-aliasing filtering.

In one embodiment, the present invention is implemented as a system for graphics processing (e.g., in hardware or software). The system includes a sampling pattern module operable to determine a sampling pattern of a plurality of samples corresponding to a pixel and a sampling pattern adjustment module operable to adjust the sampling pattern based on a filter (e.g., motion blur filter). The system further includes a sample access module operable to access the plurality of samples based on the sampling pattern and a multi-sample anti-aliasing module operable to perform multi-sample anti-aliasing of the pixel based on the plurality of samples and the sampling pattern. The multi-sample anti-aliasing module may be further operable to perform multi-sample anti-aliasing of the pixel based on the plurality of samples or pixels of a current frame and a plurality of samples or pixels of a prior frame. In one embodiment, multi-sample anti-aliasing module is operable to resolve the pixel in a linear high dynamic range (HDR) color-space. In one exemplary embodiment, the multi-sample anti-aliasing comprises cubic filtering. The system may further include a pixel filtering module operable to perform per pixel filtering to determine a value for the pixel based on the plurality of samples after the multi-sample anti-aliasing. The system may further include a color space conversion module operable to convert the pixel to a low dynamic range (LDR) display color-space (e.g., for output to a display device).

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., computing system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

A shader is a program which is executed on a GPU (e.g., GPU 110). Multi-Sample Anti-aliasing (MSAA) resolve is a process (e.g., GPU hardware or software feature) where the GPU stores N samples per pixel (e.g., wherein N is 2, 3, 4, or 8). MSAA resolving is the process in which the N samples per pixel of an MSAA surface are transformed into one sample per pixel.

Color-space is a mapping from a pixel color value to display output physical intensity. Linear color-space refers to a mapping when two colors are added together and the output is the same as the result if two physical lights are added together. In contrast, perceptual color-space refers a mapping in which colors are added together but no longer match the result of the physical lights added together. Perceptual color-space mapping has a distribution which better matches how humans perceive color because humans are much more sensitive to differences in darks than differences in lights. Perceptual color-space has a mapping that has a perceptually even distribution of shades.

Low-dynamic-range (LDR) refers to colors being limited to the range which can be displayed by a display device (e.g., monitor or screen). In contrast, high-dynamic-range (HDR) refers to colors having a range which is brighter than the range which can be displayed on a display device.

Lenses (e.g., camera or eye) typically are not perfectly smooth resulting in a small amount of diffusion of bright objects in the view. This is often called "bloom" or lens diffusion. Graphics engines can leverage lens diffusion during an HDR to LDR conversion to provide hints as to the intensity and color of areas which cannot be displayed.

Computer System Environment

Figure 1:
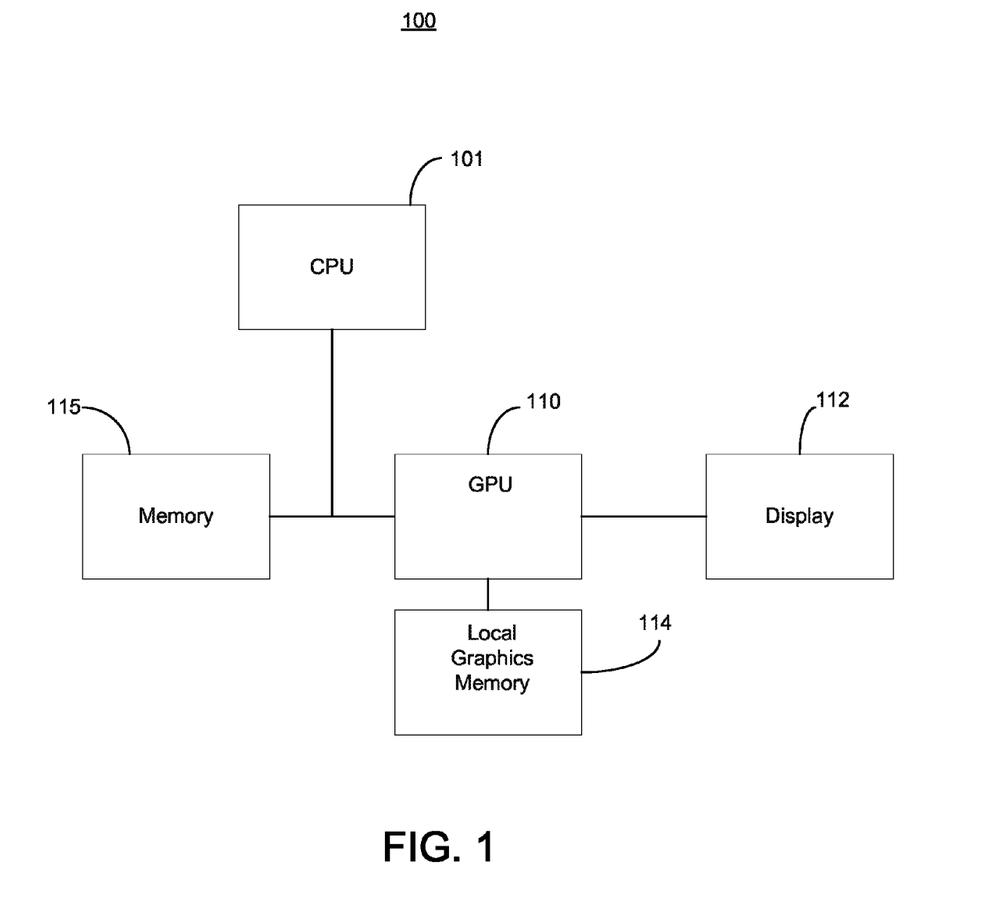
FIG. 1 shows a computer system in accordance with one embodiment of the present invention.

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 may be coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The CPU 101 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

Exemplary Systems and Methods Enhanced Multi-Sample Anti-Aliasing

Embodiments of the present invention are operable to perform post-processing processes before or during multi-sample anti-aliasing resolve thereby providing enhanced and more accurate visual quality. Embodiments of the present invention are operable to perform post-processing processes before or during multi-sample anti-aliasing resolve thereby providing enhanced and more accurate visual results. Embodiments of the present invention further utilize results or samples from prior frames to perform temporal anti-aliasing thereby increasing visual quality (e.g., reduced flicker and ghosting).

Figure 2A:
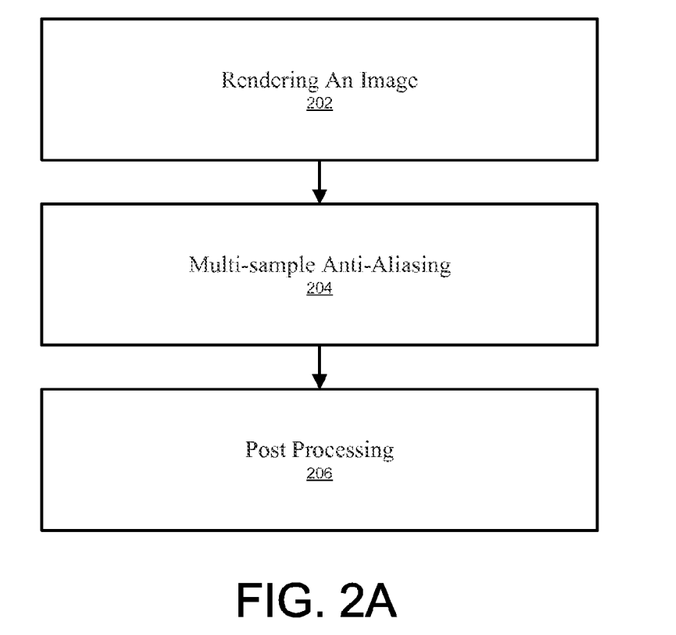
FIG. 2A shows a flowchart of a conventional process for anti-aliasing and post-processing.

FIG. 2A shows a flowchart of a conventional process for anti-aliasing and post-processing. Flowchart 200 depicts a process of post-processing that is performed after graphics rendering and anti-aliasing.

Figure 2B:
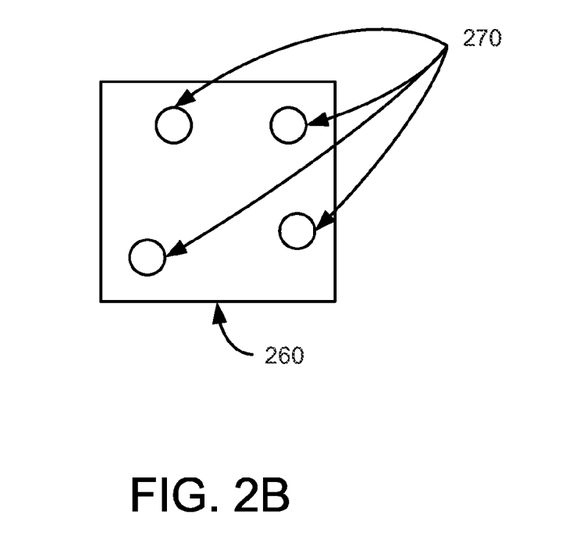
FIG. 2B shows a pixel and samples of the pixel used in conventional anti-aliasing.

At block 202, an image is rendered. The rendering outputs multiple samples within each pixel of the image. Referring to FIG. 2B, samples 270 are output for pixel 260.

Referring back to FIG. 2A, at block 204, multi-sample anti-aliasing resolve is performed. The multi-sample anti-aliasing resolve averages the multiple samples (e.g., samples 270) to determine a sample for a pixel (e.g., pixel 260).

At block 206, post-processing is performed. The post-processing is performed on a per pixel basis based on the single sample determined for each pixel during block 204.

With reference to FIGS. 3A, 3B, 4, and 5, flowcharts 300-500 illustrate example functions used by various embodiments of the present invention for improved multi-sample anti-aliasing and post-processing processes. Although specific function blocks ("blocks") are disclosed in flowcharts 300-500, such steps are examples. That is, embodiments are well suited to performing various other blocks or variations of the blocks recited in flowcharts 300-500. It is appreciated that the blocks in flowcharts 300-500 may be performed in an order different than presented, and that not all of the blocks in flowcharts 300-500 may be performed. Blocks of flowcharts 300-500 may be performed by a GPU or CPU.

Figure 3A:
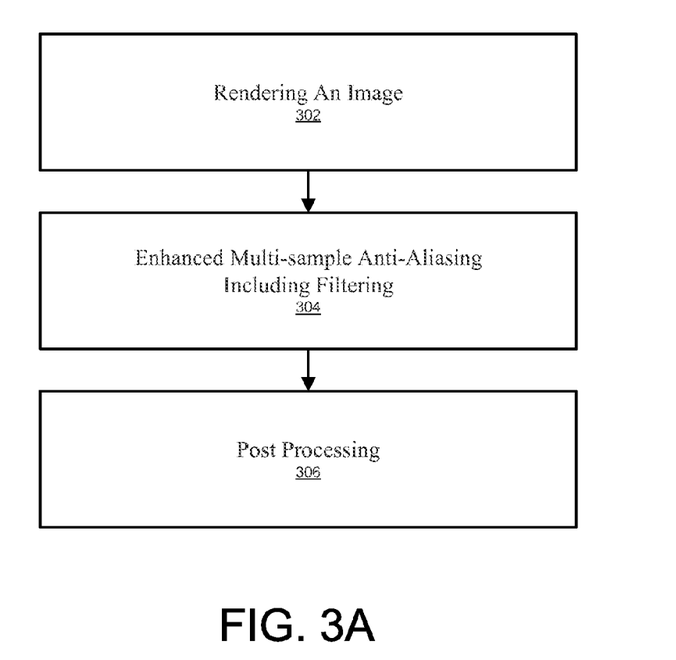
FIG. 3A shows a flowchart of an exemplary computer controlled process for anti-aliasing and post-processing, in accordance with one embodiment of the present invention.

FIG. 3A shows a flowchart of an exemplary computer controlled process for anti-aliasing and post-processing, in accordance with one embodiment of the present invention. FIG. 3A depicts a flowchart of process for improved anti-aliasing and application of post-processing processes. In one embodiment, techniques used in conventional post-processing are performed during or before anti-aliasing.

Figure 3B:
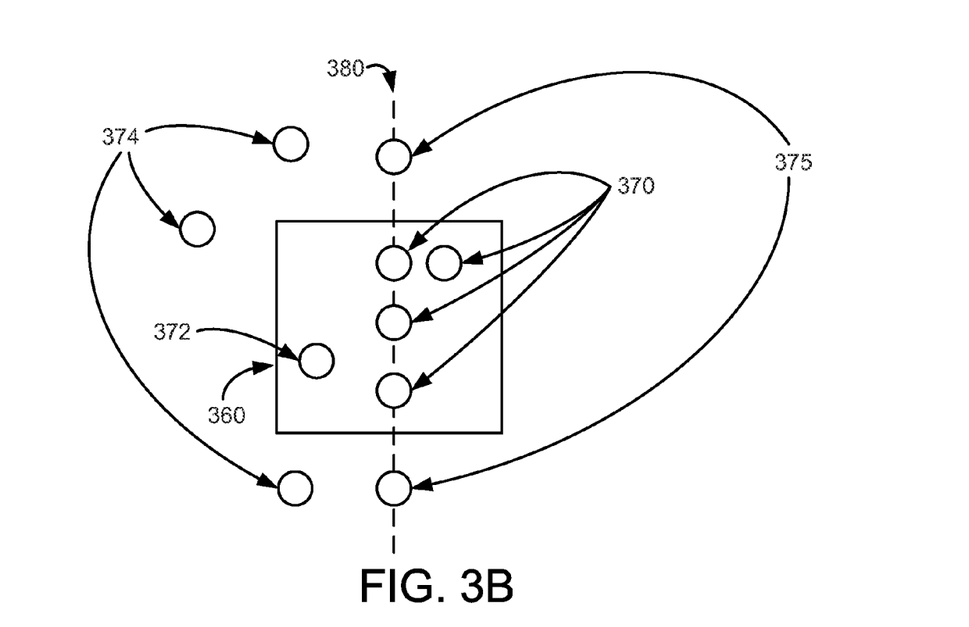
FIG. 3B shows exemplary samples inside a pixel and exemplary samples outside of the pixel, in accordance with one embodiment of the present invention.

At block 302, an image is rendered. The image may be a frame or scene rendered via a GPU (e.g., GPU 110). Referring to FIG. 3B, FIG. 3B show an exemplary pixel 360 of the rendered image, samples 370-372 inside of pixel 360, and samples 374-375 outside of pixel 360. Samples 370-372 and 374-375 are produced as part of the rendering process. It is noted that samples 374-375 outside of pixels 360 are samples corresponding to pixels near pixel 360 (e.g., pixels adjacent to pixel 360).

Referring back to FIG. 3A, at block 304, enhanced multi-sample anti-aliasing resolve including filtering is performed. The enhanced multi-sample anti-aliasing resolve may include filtering that is performed during conventional post-processing. For example, samples 370 and 375 may be used to perform multi-sample anti-aliasing resolve based on exemplary motion vector 380.

At block 306, post-processing is performed. The post-processing may include a reduced number of processes as some conventional post-processing may be performed during or before the anti-aliasing of block 304.

Figure 4:
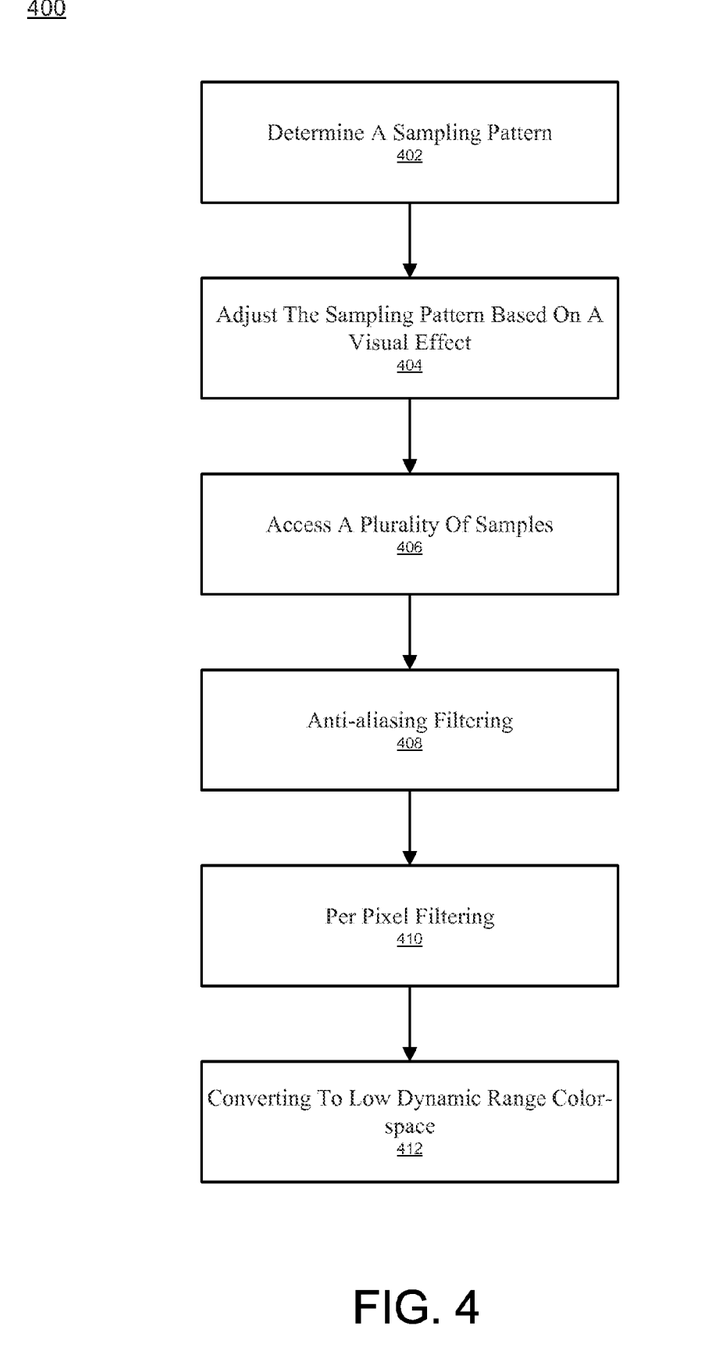
FIG. 4 shows a flowchart of an exemplary computer controlled process for anti-aliasing, in accordance with one embodiment of the present invention.

FIG. 4 shows a flowchart of an exemplary computer controlled process for anti-aliasing, in accordance with one embodiment of the present invention. FIG. 4 depicts a process for multi-sample anti-aliasing resolve comprising post-processing processes or techniques thereby improving visual quality. Embodiments of the present invention are operable to apply post-processing processes before or during multi-sample anti-aliasing resolving instead of after multi-sample anti-aliasing resolving. In one embodiment, a pipeline (e.g., of a GPU) reads the multi-sample anti-aliasing surface from external memory (e.g., GPU memory) to a cache once (e.g., GPU cache) for application of multi-sampling anti-aliasing resolve and post-processing. The multi-sampling anti-aliasing resolve and post-processing are thereby optimized via a single memory access.

At block 402, a sampling pattern is determined. The sampling pattern may correspond to a pixel. The sampling pattern may be determined based on a selected filter. For example, a cubic filter or Gaussian filter may be used to select samples that are inside a pixel (e.g., samples 370-372) and samples that are outside of the pixel (e.g., samples 374-375). Embodiments of the present invention are thus operable to fetch M samples (where M>N) where the M samples (e.g., samples 370-372 and samples 374-375) include both N samples inside the pixel (e.g., samples 370-372) and samples outside the pixel (e.g., samples 374-375).

At block 404, the sampling pattern is adjusted based on a visual effect. The visual effect may be a post-processing effect. The M samples may be adjusted or selected based on the post-processing effect to be applied to the N samples within the pixel. For example, motion blur may utilize samples along a line of motion and the M samples are reconfigured or redetermined based on location along the line of motion (e.g., motion vector 380). As another example, depth of field might utilize samples in a circle and the M samples are reconfigured or re determined to locations inside the circle. In other words, post-processing effects are applied before the samples are filtered down to a single sample for each pixel (e.g., during multi-sample anti-aliasing resolve).

At block 406, a plurality of samples is accessed. In one embodiment, a first plurality of samples is accessed based on the sampling pattern. The first plurality of samples may comprise a second plurality of samples within the pixel (e.g., samples 370-372) and a third plurality of pixels outside of the pixel (e.g., samples 374-375).

At block 408, anti-aliasing resolve is performed. The anti-aliasing resolve may include multi-sample anti-aliasing resolving the M samples into one sample per pixel. Anti-aliasing resolve of a pixel is performed based on a plurality of samples (e.g., samples 370-372 inside the pixels and samples 374-375 outside the pixel) and the sampling pattern (e.g., based on a filter or post-processing effect including motion blur or depth of field). In one embodiment, the anti-aliasing resolve may comprise cubic filtering which reads samples from both inside and outside of a pixel thereby providing higher quality filtering. In one exemplary embodiment, the anti-aliasing resolve comprises cubic filtering.

The anti-aliasing filtering may comprise resolving the pixels in a linear high dynamic range (HDR) color-space. The resolving in linear HDR color-space enables correct blending of colors between background and foreground post-processed samples.

At block 410, per pixel filtering is performed. In one embodiment, the per pixel filtering may determine a value for the pixel on a per pixel basis after the anti-aliasing filtering. In one exemplary embodiment, the per pixel filtering includes application of per pixel post-processing processes (e.g., post-processing processes not performed during multi-sample anti-aliasing). For example, once-per-pixel processes such as film grain may be applied.

At block 412, conversion to low dynamic range (LDR) color-space is performed. In one embodiment, linear HDR color is converted to LDR display color-space for use in output to a display device. The conversion to LDR display color-space thereby provides physically correct color processing throughout a graphics pipeline.

Figure 5:
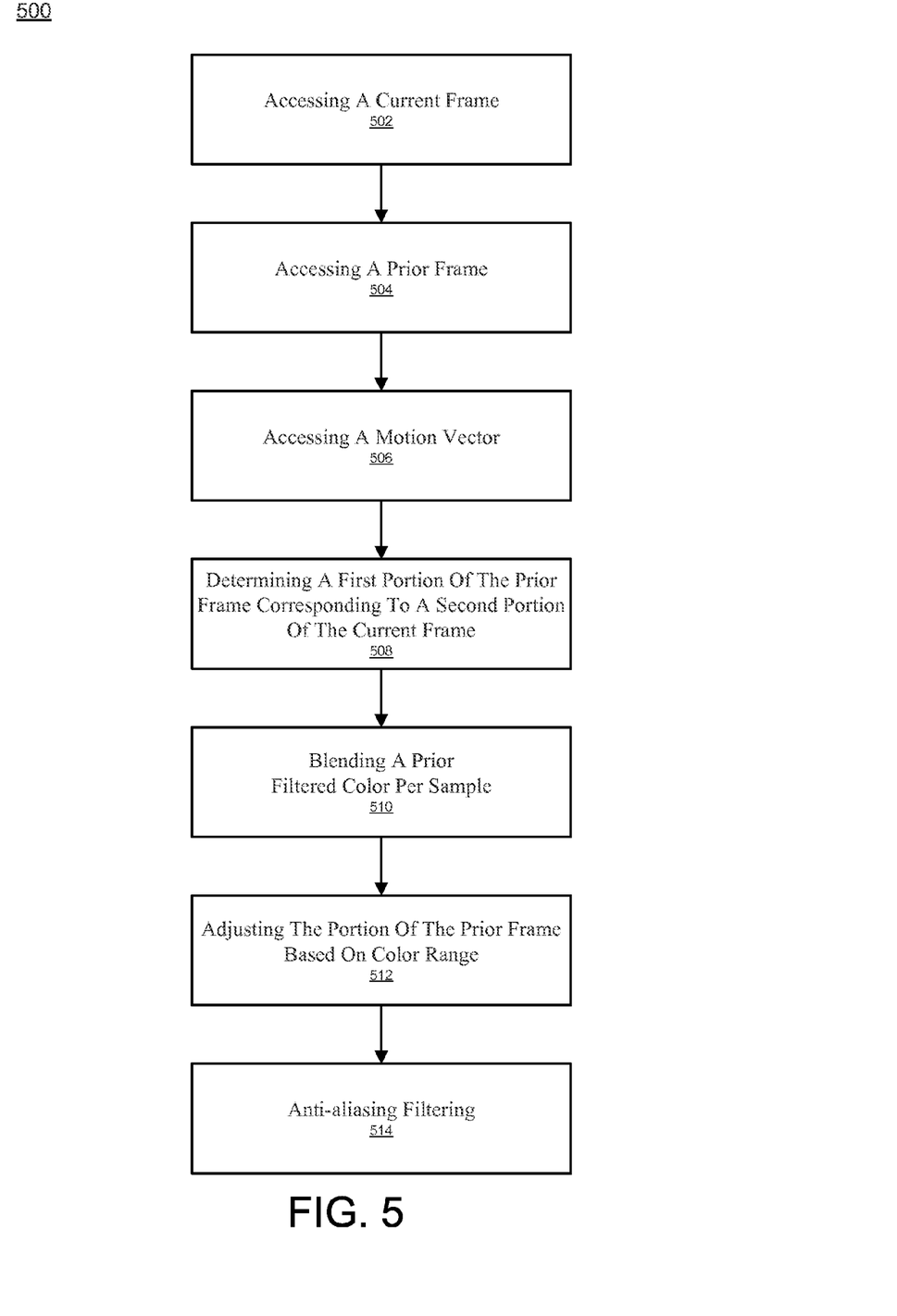
FIG. 5 shows a flowchart of an exemplary computer controlled process for temporal anti-aliasing, in accordance with one embodiment of the present invention.

FIG. 5 shows a flowchart of an exemplary computer controlled process for temporal anti-aliasing, in accordance with one embodiment of the present invention. FIG. 5 depicts a process for reducing temporal aliasing (e.g., flicker or ghosting) using samples or pixels from a prior frame and a current frame to increase visual quality. Embodiments of the present invention are operable to increase the effective number of samples per pixel by utilizing or accessing samples or pixels from a prior frame thereby increasing visual quality.

At block 502, a current frame is accessed. In one embodiment, samples corresponding to pixels of a current frame are accessed. In another embodiment, pixels corresponding to a current frame are accessed.

At block 504, a prior frame is accessed. In one embodiment, samples corresponding to pixels of a prior frame are accessed. In another embodiment, pixels corresponding to a prior frame are accessed.

At block 506, a motion vector is accessed. The motion vector may correspond to motion of an object or a graphics primitive in the prior frame and the current frame. The motion vector may further correspond to a motion blur filter to be applied to the current frame.

At block 508, a portion of the prior frame corresponding to a portion of the current frame is determined based on the motion vector. In one exemplary embodiment, a previous or prior frame is mapped to a current frame based on the motion vector. The motion vector may be used to determine corresponding pixels or samples between the current frame and the prior frame. In one embodiment, the portion of the prior frame comprises a pixel. In another embodiment, the portion of the prior frame comprises a plurality of samples. It is noted that the portion of the prior frame and the portion of the current frame may each comprise more than one sample or pixel.

In one exemplary embodiment, the motion vector may be used to determine pixels or samples from the prior frame which correspond to pixels or samples in the current frame. "Back-projection" or tracing the motion vector backwards may be used to provide the location of a pixel or sample in the prior frame. In one embodiment, back-projected temporal feedback is used to reduce temporal aliasing or flicker in motion caused by having a limited number of samples per pixel. Embodiments of the present invention are operable substantially reduce such flickering by filtering temporally. In another embodiment, temporal feedback is applied locally per sample instead of on a per pixel basis.

At block 510, a prior filtered color is blended for each sample or pixel. In one embodiment, the blending of a prior filtered sample or pixel (e.g., of a previous frame or portion of the current frame) with one of the plurality of samples is performed prior to the multi-sample anti-aliasing resolve. In one exemplary embodiment, prior post-processed colors for each sample are blended in before filtering the M samples into one sample per pixel (e.g., during multi-sample anti-aliasing resolve). The graphics engine might compute post-processing at a lower resolution for higher performance. Then for each sample, the sample is blended between the sample's color and the interpolated post-processed color based on how much post-processing should apply to the sample.

At block 512, the portion of the prior frame is adjusted based on color range. Embodiments of the present invention are operable to remove ghosting by using information from the M samples per pixel to limit the temporal feedback. For example, if the temporal feedback (e.g., samples or pixels from a prior frame) is outside the color range of the M samples (e.g., of the current frame), the temporal feedback is reduced in proportion to how far the temporal feedback is out of color range of the M samples (e.g., samples of the current frame).

At block 514, anti-aliasing filtering is performed. In one embodiment, the multi-sample anti-aliasing resolving of the portion of the current frame is based on the portion of the prior frame and the portion of the current frame. For example, the anti-aliasing may operable to reduce flicker and increase visual clarity. In one exemplary embodiment, the first portion of the prior frame is reduced in proportion to an amount that the first portion of the prior frame is out of the color range of the portion of the current frame.

Figure 6:
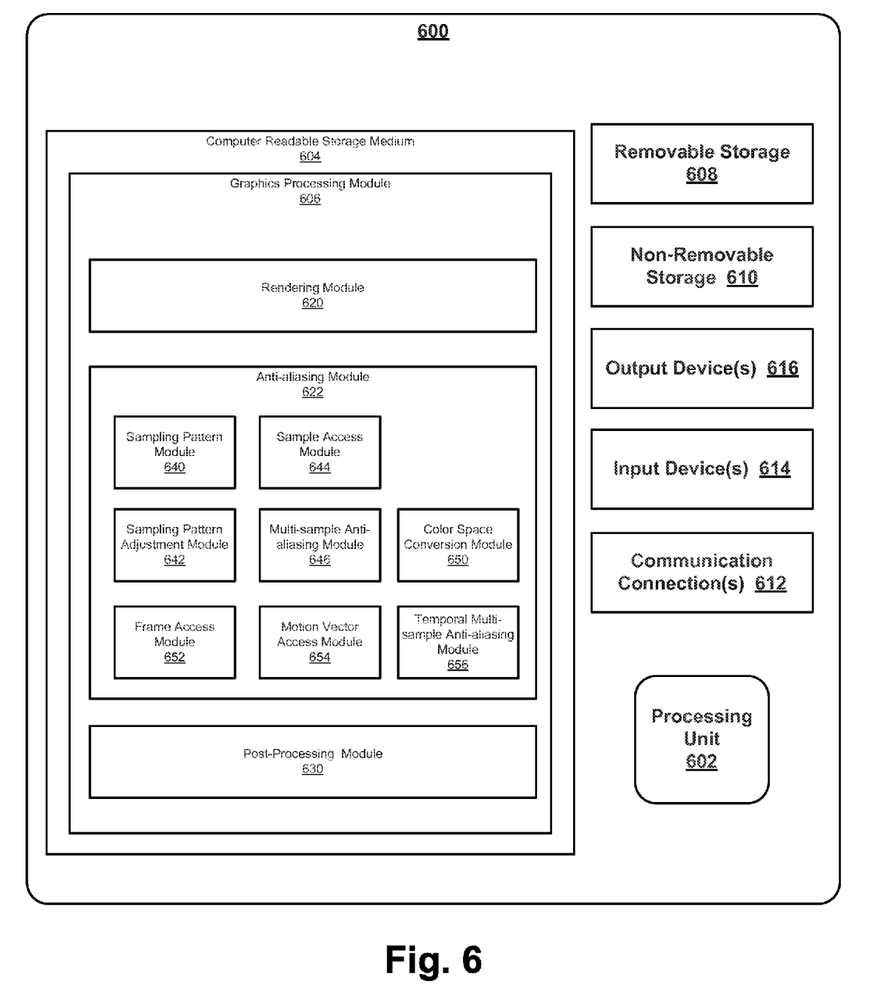
FIG. 6 shows a block diagram of exemplary computer system and corresponding modules, in accordance with one embodiment of the present invention.

FIG. 6 illustrates exemplary components used by various embodiments of the present invention. Although specific components are disclosed in computing system environment 600, it should be appreciated that such components are examples. That is, embodiments of the present invention are well suited to having various other components or variations of the components recited in computing system environment 600. It is appreciated that the components in computing system environment 600 may operate with other components than those presented, and that not all of the components of system 600 may be required to achieve the goals of computing system environment 600. It is noted that modules 620-652 may be implemented in hardware (e.g., as part of a GPU) or software as shown or in various combinations thereof.

FIG. 6 shows a block diagram of exemplary computer system and corresponding modules, in accordance with one embodiment of the present invention. With reference to FIG. 6, an exemplary system module for implementing embodiments includes a general purpose computing system environment, such as computing system environment 600. Computing system environment 600 may include, but is not limited to, servers, desktop computers, laptops, tablet PCs, mobile devices, and smartphones. In its most basic configuration, computing system environment 600 typically includes at least one processing unit 602 and computer readable storage medium 604. Depending on the exact configuration and type of computing system environment, computer readable storage medium 604 may be volatile (such as RAM), non-volatile (such as ROM, flash memory, etc.) or some combination of the two. Portions of computer readable storage medium 604 when executed facilitate enhanced multi-sample anti-aliasing (e.g., processes 300-500).

Additionally, computing system environment 600 may also have additional features/functionality. For example, computing system environment 600 may also include additional storage (removable and/or non-removable) including, but not limited to, magnetic or optical disks or tape. Such additional storage is illustrated in FIG. 10 by removable storage 608 and non-removable storage 610. Computer storage media includes volatile and nonvolatile, removable and non-removable media implemented in any method or technology for storage of information such as computer readable instructions, data structures, program modules or other data. Computer readable medium 604, removable storage 608 and nonremovable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 600. Any such computer storage media may be part of computing system environment 600.

Computing system environment 600 may also contain communications connection(s) 612 that allow it to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 612 may allow computing system environment 600 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 612 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 600 may also have input device(s) 614 such as a keyboard, mouse, pen, voice input device, touch input device, remote control, etc. Output device(s) 616 such as a display, speakers, etc. may also be included. All these devices are well known in the art and are not discussed at length.

In one embodiment, computer readable storage medium 604 includes graphics processing module 606. Graphics processing module 606 includes rendering module 620, anti-aliasing module 622, and post-processing module 630. Rendering module 620 is operable to render a scene or image and determine a plurality of samples for each pixel of the image.

Anti-aliasing module 622 includes sampling pattern module 640, sampling pattern adjustment module 642, sample access module 644, multi-sample anti-aliasing module 646, color space conversion module 650, frame access module 652, motion vector access module 654, and temporal multi-sample anti-aliasing module 656. In one embodiment, sampling pattern module 640 is operable to determine a sampling pattern of a plurality of samples corresponding to a pixel (e.g., a selection of samples of a pixel), as described herein. Sampling pattern adjustment module 642 is operable to adjust the sampling pattern based on a filter (e.g., motion blur filter or depth of field filter). Sample access module 644 is operable to access the plurality of samples based on the sampling pattern, as described herein.

Multi-sample anti-aliasing module 646 is operable to perform multi-sample anti-aliasing resolve of the pixel based on the plurality of samples and the sampling pattern, as described herein. In one embodiment, multi-sample anti-aliasing module 646 is operable to resolve the pixel in a linear high dynamic range (HDR) color-space. In one exemplary embodiment, the multi-sample anti-aliasing resolve comprises cubic filtering. In another embodiment, multi-sample anti-aliasing module 646 is operable to perform multi-sample anti-aliasing resolve of the pixel based on the plurality of samples of a current frame and a plurality of samples of a prior frame.

Color space conversion module 650 is operable to convert the pixel to a low dynamic range (LDR) display color-space.

Frame access module 652 is operable to access a prior frame and a current frame (e.g., of a video or rendered output). Motion vector access module 654 is operable to access a motion vector (e.g., corresponding to a graphics primitive, samples, or pixels of a prior frame and a current frame). Temporal multi-sample anti-aliasing module 656 is operable to determine a portion of the prior frame that corresponds to a portion of the current frame based on a motion vector. Temporal multi-sample anti-aliasing module 656 is further operable to perform multi-sample anti-aliasing resolve of the portion of the current frame based on the portion of the prior frame and the portion of the current frame.

Post-processing module 630 is operable to perform any remaining post-processing processes that were not applied by anti-aliasing module 622 or temporal multi-sample anti-aliasing module 656.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of enhancing visual quality of an image for rendering on a display screen of a computing device, the computing device further including a processor and a memory storing instructions, said method comprising:
   determining, by the processor, a sampling pattern corresponding to a pixel within the image;
   adjusting, by the processor, said sampling pattern based on a visual effect to produce an adjusted sampling pattern;
   accessing, from the memory, a first plurality of samples based on said adjusted sampling pattern, wherein said first plurality of samples comprises a second plurality of samples within said pixel and a third plurality of samples outside of said pixel; and
   filtering, by the processor, said first plurality of samples to provide a resolved single sample pixel based on said first plurality of samples and said adjusted sampling pattern.

2. The method as described in claim 1 wherein said filtering comprises resolving said pixel in a linear high dynamic range (HDR) color-space.

3. The method as described in claim 1 wherein said filtering comprises cubic filtering.

4. The method as described in claim 2 wherein said resolving said pixel in a linear high dynamic range (HDR) color-space comprises blending a plurality of colors between background and foreground post-processed samples.

5. The method as described in claim 1 further comprising:
   converting said resolved single sample pixel to a low dynamic range (LDR) display color-space.

6. The method as described in claim 1 wherein said visual effect is performed during post-processing.

7. The method as described in claim 1 wherein said visual effect comprises at least one of: motion blur and depth of field.

8. A method for increasing visual quality of an image for rendering on a display screen of a computing device, the computing device having a processor and a memory including instructions executable by the processor to:
   access, from the memory, a current frame of the image;
   access, from the memory, a prior frame of the image;
   access a motion vector mapping an image element common to said prior frame and said current frame;
   determine, at the processor, a portion of said prior frame corresponding to a portion of said current frame based on said motion vector; and
   filter said portion of said current frame to provide a resolved current frame portion based on said portion of said prior frame and said portion of said current frame.

9. The method as described in claim 8 wherein said portion of said prior frame comprises a pixel.

10. The method as described in claim 8 wherein said portion of said prior frame comprises a plurality of samples.

11. The method as described in claim 8 wherein the instructions are further executable by the processor to: blend a prior filtered color sample with said portion of said current frame prior to said multi-sample anti-aliasing.

12. The method as described in claim 8 wherein the instructions are further executable by the processor to reduce said portion of said prior frame in proportion to an amount that said portion of said prior frame is out of the color range of said portion of said current frame.

13. The method as described in claim 8 wherein said filtering reduces flickering of the image to be rendered on the display screen.

14. A system for graphics processing, said system including a processor, a display screen for displaying an image, and a memory storing instructions, the instructions being executable in the processor and the system comprising:
   a sampling pattern module configured to determine a sampling pattern of a plurality of samples corresponding to a pixel in the image;
   a sampling pattern adjustment module configured to adjust said sampling pattern based on a filter to produce an adjusted sampling pattern;
   a sample access module configured to access said plurality of samples based on said adjusted sampling pattern; and
   a filtering module configured to provide a resolved single sample pixel based on said plurality of samples and said adjusted sampling pattern.

15. The system as described in claim 14 wherein said filtering module resolves said pixel in a linear high dynamic range (HDR) color-space.

16. The system as described in claim 14 wherein said filtering module comprises a cubic filtering module.

17. The system as described in claim 14 wherein the filtering module comprises a temporal filtering module configured to provide the resolved single sample pixel based on a portion of a current frame and a portion of a prior frame.

18. The system as described in claim 14 further comprising: a color space conversion module for converting said pixel to a low dynamic range (LDR) display color-space.

19. The system as described in claim 14 wherein said filtering module comprises a motion blur filtering module.

20. The system as described in claim 14 further wherein said filtering module provides a resolved single sample pixel based on said plurality of samples of a current frame and a plurality of samples of a prior frame.

* * * * *